F. PARSON & E. W. PARKER.
Tail-Net for Horses.
No. 127,918.
Patented June 11, 1872.
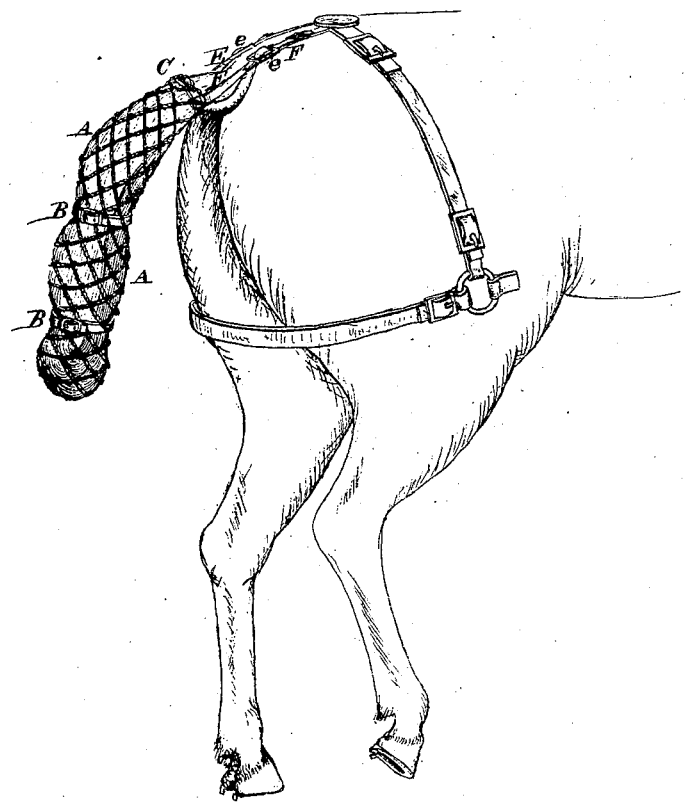
ATTEST,
Jas. L. Ewin
Walter Allen
INVENTOR
Frank Parson
Erastus W. Parker
By Knight Bros
Attys.

127,918

UNITED STATES PATENT OFFICE.

FRANK PARSON, OF ST. LOUIS, MISSOURI, AND ERASTUS W. PARKER, OF PENN YAN, NEW YORK.

IMPROVEMENT IN TAIL-NETS FOR HORSES.

Specification forming part of Letters Patent No. 127,918, dated June 11, 1872.

Specification describing a certain Tail-Net for Horses, invented by FRANK PARSON, of the city and county of St. Louis and State of Missouri, and ERASTUS W. PARKER, of Penn Yan, in the county of Yates and State of New York.

Our invention consists in a net or case for inclosing and confining the tail of a horse, for use in muddy weather, to avoid the necessity of tying up the tail in the usual manner, and the injury to the horse resulting therefrom.

A is a net in which the threads are knotted together in the usual manner, the net being made of any suitable material. B are straps passing through the netting and surrounding the tail. C is a strap connected to the top of the netting and surrounding the tail near the crupper. From the strap C proceed straps E, connected, by buckles e, to the straps F, to which the crupper is also connected. A simpler modification of our improvement may have a number of straps, B, secured to one or more vertical straps connected to the back-band, as proposed, the netting A being dispensed with, and the straps B, and the vertical straps connecting them, forming a case equivalent thereto.

In muddy weather it is the common practice, with horses traveling the road or street, to twist the lower part of the tail and to coil it around the dock or fleshy part; and to prevent the tail from falling loose it is necessary that it should be tightly twisted and wound, thus causing considerable strain upon the roots of the hairs, and tending to stop the circulation of blood in the tail. The uneasiness and even pain given to the horse must be considerable, and to render the above cruel practice unnecessary we have contrived our improvement.

We claim—

The tail-net A or its described equivalent, with encircling straps B and C, in combination with the supporting-straps E, substantially as and for the purposes set forth.

FRANK PARSON.
ERASTUS W. PARKER.

Witnesses:
SAML. KNIGHT,
STEPH. BERNARD.